2,990,521
MAGNETIC MODULATORS

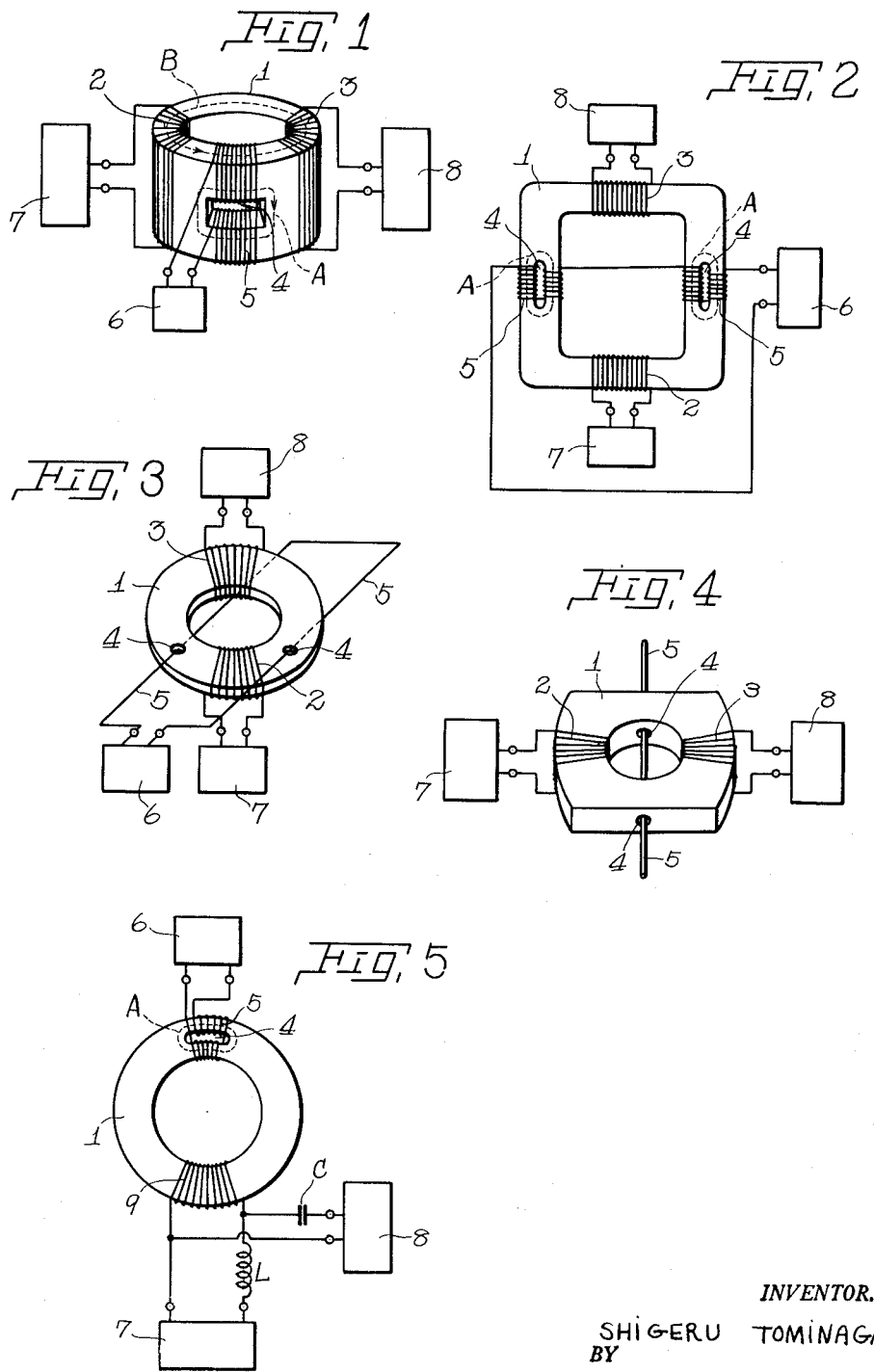

Shigeru Tominaga, Yachiyo-machi, Chiba-gun, Chiba-ken, Japan, assignor to Tokyo Denki Kagaku Kogyo-Kabushiki Kaisha, Tokyo-to, Japan
Filed Feb. 19, 1958, Ser. No. 716,058
Claims priority, application Japan Feb. 23, 1957
2 Claims. (Cl. 332—51)

This invention relates to improvements in apparatus for taking out an output corresponding to a D.-C. input signal. The term "D.-C." is intended to signify "direct current" in this specification and claims.

In various kinds of electrical measuring instruments such as thermocouples, resistance thermometers, pH-meters and gas analyzing meters, it is very necessary to detect and sometimes amplify a very weak D.-C. voltage generated in sensitive elements of these instruments, and that, in case to apply them to automatic control system, it is indispensable to amplify the very weak D.-C. input signal.

It is, however, extremely difficult to amplify such a D.-C. input signal as it is, comparing with an A.-C. amplification. Accordingly, in general, a D.-C. input signal is converted into an alternating current and then amplified. For this purpose, a vibration chopper or a magnetic modulator comprising a set of two reactors has been generally used heretofore. However, such defects have been found in them that the vibrator chopper type goes wrong frequently because of its inherent mechanical vibration which makes its action unstable and that using two reactors is produced with a considerably poor yield since it is extremely difficult to equalize characteristics of the two reactors ending in to be a remarkable obstacle to a commercial production.

One object of this invention is to provide an apparatus for taking out a converted output corresponding to a D.-C. input signal, of practically good ability overcoming such defects as above found in prior arts.

Another object of this invention is to provide a magnetic modulator which may be applied to an input circuit of a parametron logical circuit in which a D.-C. signal is frequently used as the input.

Still another object of this invention is to provide a foul and trouble proof and highly sensitive magnetic modulator which requires to comprise neither mechanically vibrating parts nor precisely balanced reactors, and may be, thus, produced economically and operated easily.

A further object of this invention is to provide a magnetic modulator having a circuit which is adaptable not only as an input circuit for a parametron logical circuit of an electronic computer, but also for taking out a parametron control signal directly from an extremely weak D.-C. input in, for example, a thermocouple, a thermistor, or a glass electrode, which may be, therefore, useful extremely effectively in various kinds of measurements and calculations, automatic recordings, automatic controls, and automatic operations.

According to this invention, an input coil and an output coil are provided on a magnetic core constituting a closed magnetic circuit. A converted output corresponding to a D.-C. signal input applied to the input coil, such as a sinusoidal wave, a pulse wave, a distorted wave, an impulse wave, etc., is taken out by means of varying the magnetic reluctance of the closed magnetic circuit. I have found that it is possible to vary the magnetic reluctance of the magnetic core constituting the closed magnetic circuit, correspondingly to the oscillation frequency of the parametron. Thus, parametrons in the two states of oscillation, whose phases are differing 180° with each other, are made to be useful in a circuit for a selective control corresponding to the polarity of a weak D.-C. input voltage. Furthermore, according to this invention, it is possible to obtain a signal output with a high sensitivity which contains very much of components of the parametric oscillation frequency, and to invert the phase of the output by means of the polarity conversion of the direct current input. Using the output from the magnetic modulator of this invention as a controlling input of the parametric oscillation, it becomes possible to control the state of the parametric oscillation in accordance with the polarity of a weak D.-C. input.

This invention relates to certain improvements and combinations thereof other than the above-stated gists, objects and advantages, which will be set forth in detail hereinafter and defined by the appended claims.

In the drawings illustrating embodiments of this invention:

FIG. 1 is an explanatory diagram showing the principles of this invention.

FIGS. 2, 3, 4, and 5 show various connections embodying this invention within the scope thereof.

Referring now to FIGS. 1 and 2, there is a magnetic core 1 constituting a closed magnetic circuit. A D.-C. input coil 2 and an output coil 3 are wound on the core 1. At least a hole 4 is perforated intermediate the main magnetic circuit of the magnetic core 1. At least a coil 5 is wound across the main magnetic circuit and through the hole 4 and connected with an energy source 6 for varying the magnetic reluctance. A term "acting portion" used hereinafter in the specification and claims is intended to designate for the portion including the coil 5 and the hole 4. A D.-C. input source 7 is connected with the D.-C. input coil 2. An output load 8, for example, an amplifier, is connected with the output coil 3. It is possible to induce an output which will not contain a noise or a background noise by means of making circuits of the magnetic flux generated entirely around the hole 4 so as to be located avoiding to combine with the output coil during the coil 5 is energized. When the coil 5 is energized by an electric energy from the energy source 6, a magnetic circuit A is constituted around the hole 4 so as to vary permeability in the proximity of the hole 4 and magnetic reluctance of the whole magnetic circuit B. Therefore, when a source of such a varying current as an alternating current, a pulsating current, etc. is employed as the energy source 6, the permeability in the proximity of the hole 4 varies correspondingly to the oscillation in current from the energy source 6 ending in to vary the magnetic reluctance of the magnetic circuit correspondingly to the above oscillation. Accordingly the magnetic flux formed in the magnetic circuit B generated by the D.-C. input signal causes correspondingly to the oscillation in magnetic reluctance of the main magnetic circuit ending in to obtain oscillating voltage across the output coil 3 correspondingly to the oscillation in said magnetic flux. Thus it becomes possible to take out an output of such a non-D.-C. as an alternating current, a pulsating current, a distortedly waved current, impulse-waved current, etc., corresponding to the D.-C. input and amplify the output easily at an amplifier 8, during the D.-C. input is applied from the D.-C. source 7.

Further referring to FIGS. 1 and 2, in case where an energy source for variation 6 is selected so as to supply a current having a frequency of $f/2$ or a D.-C. superposed with a frequency $f$ across the coil 5 of the hole 4, it is possible to vary the magnetic reluctance with the frequency $f$ in the proximity of the hole 4 if the strength of the current is selected suitably. When the output coil 3 is connected with the output load 8 during the D.-C. input signal is impressed to the coil 2, the amount of the magnetic flux passing through the main magnetic circuit of the magnetic core 1 becomes to oscillate correspondingly to the frequency $f$. Therefore, a voltage corresponding to the variation in the flux, that is, a variable voltage containing very much of the components of the frequency $f$, is induced across the output coil 3, since the oscillating current having a frequency corresponding to a frequency required, together with or without a D.-C., is impressed to the acting portion provided for varying the magnetic reluctance of the magnetic circuit of the magnetic core as above. The component of the frequency $f$ in the voltage is able to be employed as a controlling input of parametric oscillation because the phase of the component is inverted correspondingly to the inversion of polarity of the D.-C. input applied to the D.-C. input coil 2.

FIGS. 3 and 4 show other embodiments within the gist as above. In FIGURES 3 and 4 the core 1 is a relatively flat member having a large aperture disposed centrally thereof. Two active regions are defined by two small apertures formed in the core generally on opposite sides of the large aperture. In FIGURE 4 the small apertures are diametrically opposed relative to the large aperture while in FIGURE 3 they lie about on a tangent to the edge of the large aperture. The coil 5 constitutes a single conductive loop, which is wire in FIGURE 3, passing through the two small apertures. The action of the coil 5 in FIGURES 3 and 4 is the same as in FIGURES 1 and 2.

FIG. 5 shows still another embodiment within the scope of this invention, where a D.-C. input coil is combined with an output coil forming a single coil 9. A terminal of the coil 9 is connected with a D.-C. input source 7 through a suitable impedance, for example, an inductance L, and also connected with an amplifier or an output load 8 through a condenser C.

Now my invention has been explained in detail as above. It should be understood that this invention is not limited to the particular arrangements disclosed but that the appended claims are intended to cover all modifications, particularly in structures of the magnetic core and coil and in connections thereof, which do not depart from the true spirit and scope of the invention.

I claim:

1. A magnetic modulator comprising a magnetic core constituting a closed magnetic circuit, a direct current input coil, an output coil, said direct current input coil and said output coil being wound on said core, the latter having a slotted region, and a coil for inducing a control flux at said region, said coil having oppositely disposed convolutions wound in opposite directions around said core and extending through said slot so as to define an independent closed magnetic circuit extending around said slot and wholly confined in said region, whereby said control coil serves to vary the magnetic reluctance of said core to produce an oscillating output corresponding to the direct current input, said input coil and said output coil constituting a single coil, a load circuit, a capacitor disposed between said single coil and said load circuit, and means connecting said single coil to a direct current source, said means including an inductor which presents a high impedance to the frequency of the alternating energy in said single coil.

2. A magnetic modulator comprising a magnetic core constituting a closed magnetic circuit, a direct current input coil, an output coil, said direct current input coil and said outupt coil being wound on said core, the latter having a slotted region, and a coil for inducing a control flux at said region, said coil having oppositely disposed convolutions wound in opposite directions around said core and extending through said slot so as to define an independent closed magnetic circuit extending around said slot and wholly confined in said region, whereby said control coil serves to vary the magnetic reluctance of said core to produce an oscillating output corresponding to the direct current input, said input coil and said output coil constituting a single coil, a load circuit, a capacitor disposed between said single coil and said load circuit, and means connecting said single coil to a direct current source, said means including an inductor which presents a high impedance to the frequency of the alternating energy in said single coil, said load circuit and direct current source being connected in parallel to each other and to said single coil.

References Cited in the file of this patent

UNITED STATES PATENTS

| | | |
|---|---|---|
| 1,847,079 | Burton | Mar. 1, 1932 |
| 2,708,219 | Carver | May 10, 1955 |
| 2,782,376 | Mortimer | Feb. 19, 1957 |
| 2,820,109 | Dewitz | Jan. 14, 1958 |
| 2,855,586 | Brown | Oct. 7, 1958 |

FOREIGN PATENTS

| | | |
|---|---|---|
| 814,178 | Germany | Sept. 20, 1951 |